June 26, 1928.
S. B. HASELTINE
1,674,824
FRICTION SHOCK ABSORBING MECHANISM
Filed April 23, 1925    2 Sheets-Sheet 2
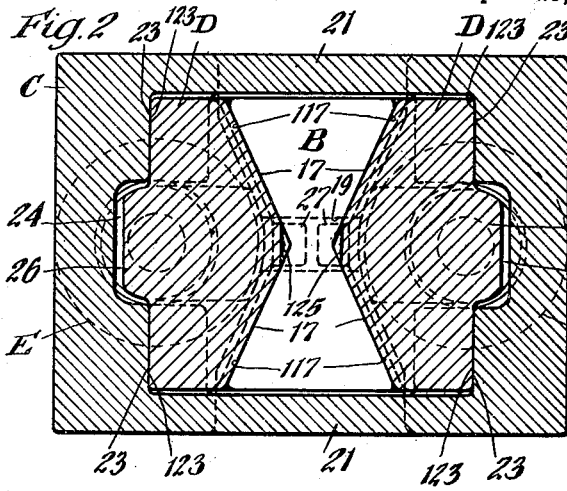
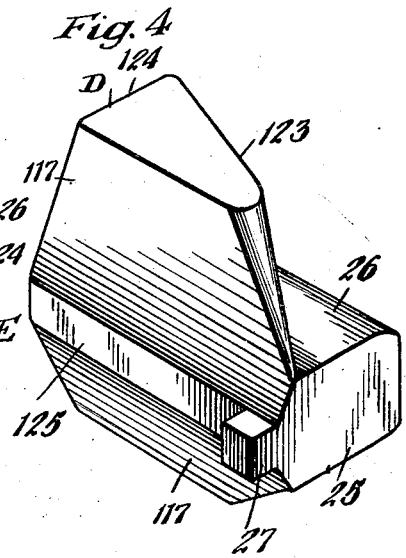
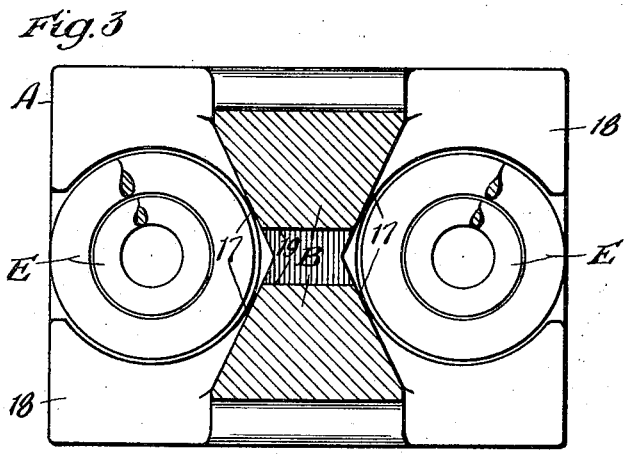
Witness
Wm. Geiger
Inventor
Stacy B. Haseltine
By George I. Haight
His Atty.

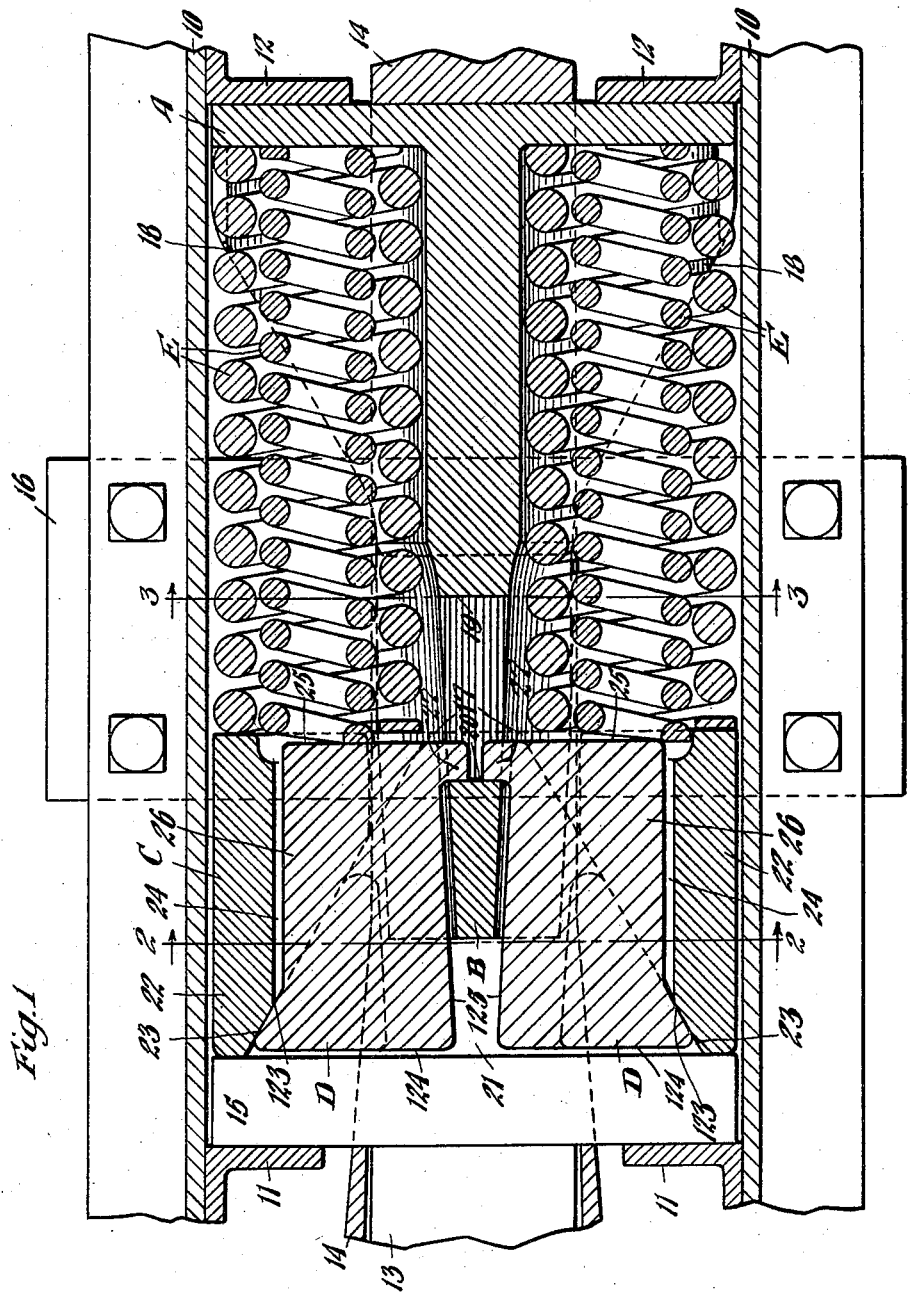

Patented June 26, 1928.

1,674,824

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 23, 1925. Serial No. 25,236.

This invention relates to improvements in friction shock absorbing mechanisms.

One object of the invention is to provide a friction shock absorbing mechanism, including a column element having friction surfaces and wedge friction means cooperating therewith, wherein is obtained high frictional capacity combined with assured release, the arrangement being such as to provide a light initial action to absorb the light shocks.

Another object of the invention is to provide a mechanism of the character indicated, including a central friction post, friction shoes cooperating with the post, pressure transmitting means and spring resisted wedge means for forcing the shoes into frictional engagement with the post.

Other objects and advantages of the invention will more clearly and fully appear from the description and claims hereinafter following.

In the drawings, forming a part of this specification, Figure 1 is a longitudinal, horizontal, sectional view of a portion of a railway draft rigging, showing my improvements in connection therewith. Figure 2 is a transverse, vertical, sectional view corresponding substantially to the line 2—2 of Figure 1. Figure 3 is a vertical, transverse, sectional view corresponding substantially to the line 3—3 of Figure 1. And Figure 4 is a detailed, perspective view of a friction shoe.

In the drawings, 10—10 indicate channel-shaped center or draft sills of a railway car underframe, to the inner surfaces of which are secured front stop lugs 11—11 and rear stop lugs 12—12. The inner end of the drawbar is indicated at 13 to which is operatively connected a hooded yoke 14 of usual construction. The shock absorbing mechanism, as well as the front main follower 15, is operatively disposed within the yoke. The yoke and the parts therewithin are supported in operative position by a detachable saddle plate 16.

The improved shock absorbing mechanism proper, as shown, comprises, broadly, a rear follower A; a friction post B; a wedge shell C; two friction shoes D—D; and twin arranged main spring resistance elements E—E.

The rear follower A is in the form of a heavy rectangular plate cooperating with the rear stop lugs 12 and has formed integral therewith the friction post B which projects forwardly therefrom and is arranged centrally of the mechanism. The friction post B is provided with longitudinally disposed friction surfaces 17—17 on the opposite sides thereof, the friction surfaces 17 being of V-shaped section and diverging rearwardly of the post. Top and bottom webs 18—18 extend forwardly from the follower A and are formed integral with the top and bottom sides of the friction post as most clearly shown in Figure 1, thereby providing re-inforcing means for the post to give great column strength. Adjacent the forward end, the post is formed with a transverse opening 19 providing a transverse abutment surface 20 at the forward end thereof for a purpose hereinafter more fully described.

The wedge shell C is in the form of a rectangular casting having top and bottom walls 21—21 and side walls 22—22, the casting being left open both at the front and rear ends. As most clearly shown in Figure 2, the side walls 22 are relatively heavy and are provided with interior, rearwardly converging, opposed wedge faces 23—23. Each of the side walls is centrally slotted on the inner side, as indicated at 24, to provide longitudinally extending ways for a purpose hereinafter described.

The two friction shoes D are of like construction, each being in the form of a heavy casting, as most clearly shown in Figure 4. Each shoe is provided with a flat transverse end face 124 at the forward end thereof adapted to cooperate with the inner surface of the main follower 15. At the rear end, each shoe is also provided with a flat surface 25 adapted to form an abutment surface to one of the spring resistance elements E. On the inner side, each shoe is provided with a longitudinally disposed friction surface 117 corresponding in contour to the friction surface 17 at the corresponding side of the post B. Between the two sections of the V-shaped friction surface 117, each shoe is cut away, as indicated at 125. Each shoe D is also provided with a wedge face 123 correspondingly inclined to and adapted to cooperate with the wedge face 23 at one side of the wedge shell C. On the outer side, each shoe has a lateral projection 26 longitudinally dividing the wedge face 123 and working within the slot 24 at the corresponding side of the wedge shell. To limit the outward movement of the friction shoes D, each shoe has a laterally extending lug 27 at the rear end thereof adapted to work in the opening 19 of the post B, the lugs 27 of the two shoes engaging the abutment face 20 when the shoes are in their outermost position.

The twin arranged spring resistance elements E are disposed at opposite sides of the post B. The units of the twin spring resistance elements each comprises a relatively heavy outer coil and a relatively light inner coil. The outer coil of each spring has its opposite ends bearing on the rear follower A and the inner end of the wedge shell C, while the inner coil thereof has its opposite ends bearing respectively on the follower A and the abutment face 25 at the inner end of the corresponding friction shoe D.

The normal position of the parts is that illustrated in Figure 1, wherein the wedge shell is shown as engaging the front follower 15 and the friction wedge shoes are slightly spaced from the inner face of the follower. The proportion and arrangement of the parts is such that when the shoes are in their outermost position the main springs B are held under initial compression.

The operation of my improved shock absorbing mechanism is as follows, during a compression stroke. As the front follower is forced inwardly relative to the rear follower A and post B, the initial action will be an inward movement of the wedge shell, resisted by the outer coils of the main spring resistance elements E. This action will continue until the clearance between the shoes and the follower 15 is taken up, whereupon the shoes will be carried rearwardly in unison with the follower, compressing the inner coils of the spring resistance elements E. As the shoes are carried inwardly along the friction post B, the former will be forced laterally apart, due to the diverging relation of the friction surfaces 17 of the post, thereby bringing the wedge faces of the shoes D into intimate engagement with the wedge faces of the wedge shell. During the continued inward movement of the shoes, there will be a relative slippage on the wedge faces 23 and 123 of the shell and shoes, causing the shell to be advanced more rapidly than the shoes and additionally compressing the outer coils of the main spring resistance elements. The described action will continue either until the actuating force is reduced, or the front follower comes into abutment with the outer end of the friction post, whereupon the pressure will be transmitted directly through the post to the rear stop lugs 12. Upon reduction of the actuating pressure, the main springs E will restore all of the parts to normal position, the shoes being limited in their outward movement by engagement of the lugs 27 thereof with the abutment face 20 of the post and outward movement of the shell in turn being limited by engagement with the wedge faces of the shoes.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a column element having opposed friction surfaces extending longitudinally thereof; of friction shoes cooperating with the friction surfaces of the column; a wedge element cooperating with the shoes; pressure transmitting means successively cooperating with the wedge element and shoes; and main spring resistance means opposing movement of the shoes and wedge element relative to said column element.

2. In a friction shock absorbing mechanism, the combination with a column element having friction surfaces extending longitudinally thereof; of a wedge element; a main follower; friction shoes cooperating with the column element, said shoes being normally out of contact with the follower and adapted to be engaged thereby after a predetermined compression of the mechanism; and main spring resistance means cooperating with said wedge element and shoes.

3. In a friction shock absorbing mechanism, the combination with a pair of relatively movable followers; a friction post carried by one of said followers, said post having diverging friction surfaces; a wedge casing cooperating with the other follower; wedge friction shoes interposed between the casing and the friction post, said shoes being normally spaced from the last named follower and adapted to be engaged thereby after a predetermined compression of the mechanism, the actuating force being transferred from the wedge casing to the shoes as the compression of the mechanism progresses, due to the diverging relation of the friction surfaces of the post; and spring resistance means opposing movement of said wedge casing and friction shoes relative to the post.

4. In a friction shock absorbing mechanism, the combination with a central friction element; of friction shoes cooperating with said element; inter-engaging means on said shoes and element for limiting the outward movement of the shoes; a spring resistance coöperating with said shoes; wedge means engaging said shoes; and pressure transmitting means cooperating with said wedge means.

5. In a friction shock absorbing mechanism, the combination with front and rear followers movable relatively toward and from each other, one of said followers having a friction post extending therefrom, said post being provided with opposed V-arranged friction surfaces extending longitudinally thereof; a pair of friction shoes having friction surfaces corresponding in contour with the friction surfaces of the post and cooperating therewith; a wedge casing having wedge faces cooperating with wedge faces of said shoes; twin arranged main spring resistance elements, each comprising an inner and an outer coil, the inner coil of each spring resistance cooperating with the corresponding shoe and the outer coil thereof cooperating with the wedge casing.

6. In a friction shock absorbing mechanism, the combination with a solid friction post, said post being cut away at opposite sides only to present approximately double triangle cross-section and a pair of V-shaped friction surfaces on opposite sides thereof diverging lengthwise of the mechanism; of twin arranged springs; friction shoes cooperable with said friction post; and wedge means cooperable with said shoes.

7. In a friction shock absorbing mechanism, the combination with a friction post of approximately double triangle cross-section and provided with friction surfaces diverging lengthwise of the post; of twin arranged springs; friction shoes cooperable with said friction post; and wedge means cooperable with said shoes, said shoes being adapted to directly receive the actuating pressure during a portion of a compression stroke.

8. In a friction shock absorbing mechanism, the combination with relatively movable follower elements, one of said elements having a friction post thereon; of a plurality of friction shoes co-operating with the post; a wedge sleeve movable relatively to the follower carrying the post, said wedge sleeve and friction shoes having co-operating wedge faces, the wedge faces of the sleeve converging inwardly of the mechanism, said shoes directly receiving the actuating force during the compression of the mechanism; and spring resistance means directly opposing movement of both said shoes and sleeve.

9. In a friction shock absorbing mechanism, the combination with front and rear follower elements, one of said follower elements carrying a friction post having friction surfaces diverging inwardly of the mechanism; of a plurality of friction shoes co-operating with the post, said shoes being engaged and directly actuated by the other follower elements during compression of the mechanism; a wedge sleeve co-operating with the shoes and adapted to directly receive the actuating force during a part only of the compression stroke, said sleeve having inwardly converging wedge faces engaging similar faces on the shoes; and a main spring resistance means directly opposing relative movement between the follower element carrying the post and both the friction shoes and wedge sleeve.

In witness that I claim the foregoing I have hereunto subscribed my name this 18th day of April, 1925.

STACY B. HASELTINE.